Patented June 10, 1924.

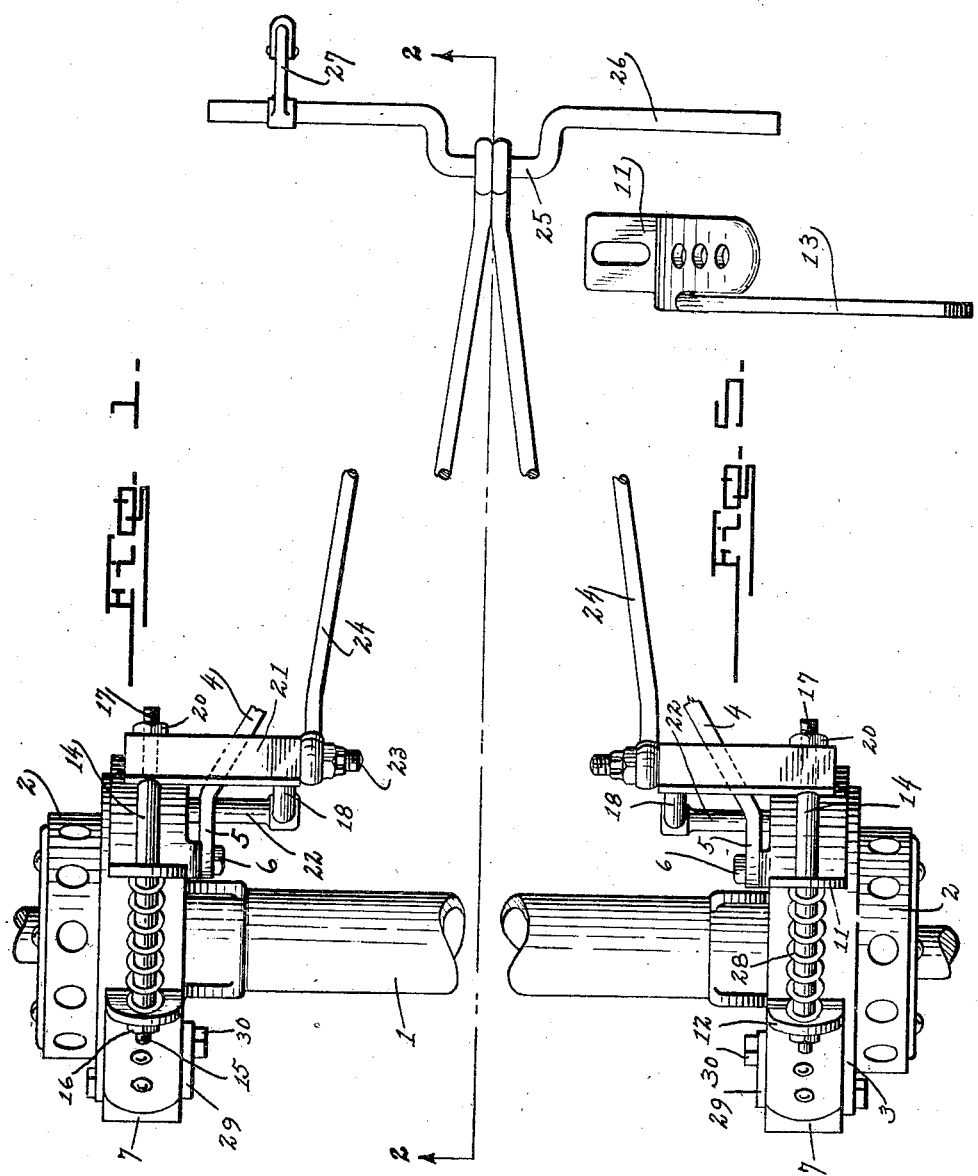

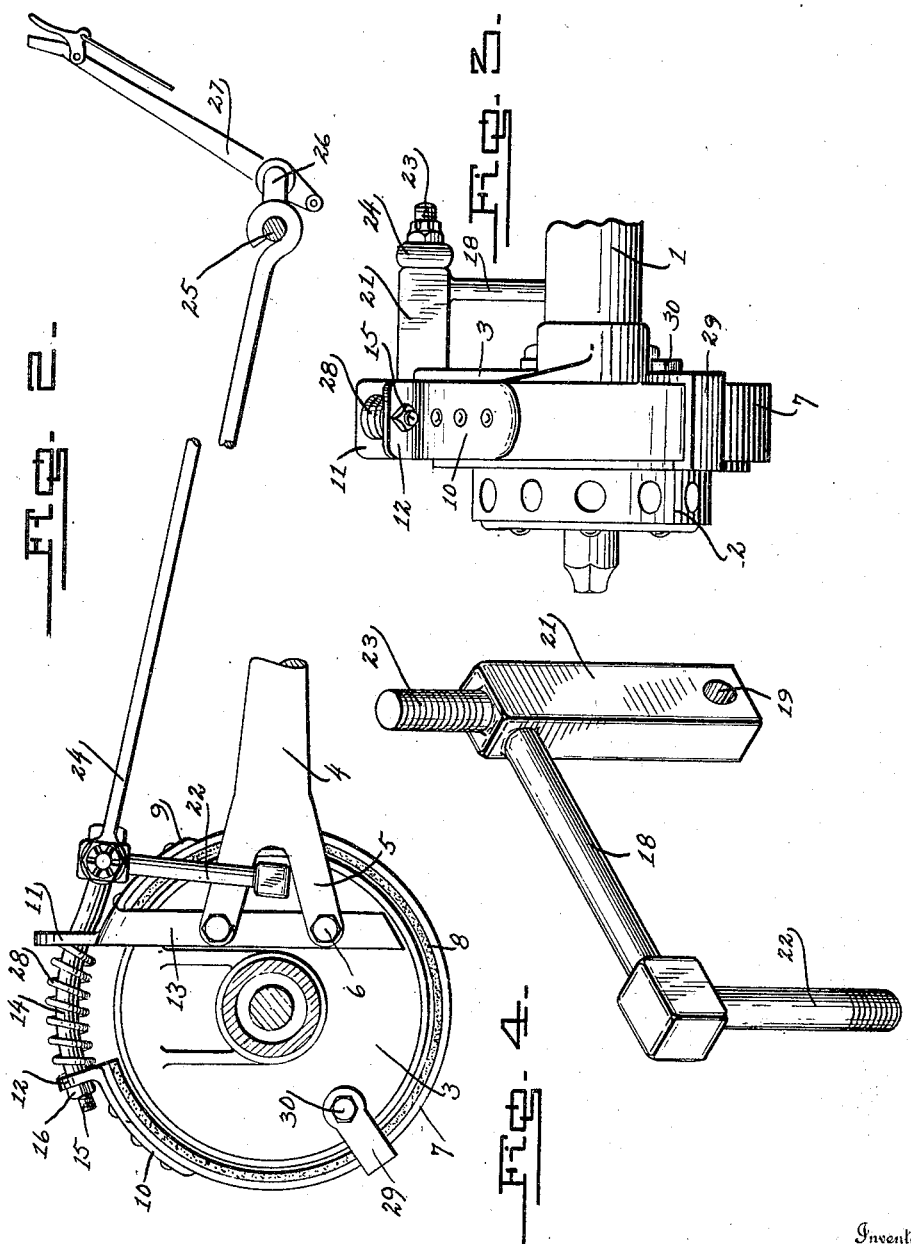

1,497,343

UNITED STATES PATENT OFFICE.

HARRY MUSICK, OF JACKSONVILLE, FLORIDA.

EMERGENCY BRAKE.

Application filed September 7, 1923. Serial No. 661,468.

*To all whom it may concern:*

Be it known that HARRY MUSICK, a citizen of the United States, residing at Jacksonville, in the county of Duval and State of Florida, has invented certain new and useful Improvements in Emergency Brakes, of which the following is a specification.

This invention relates to an emergency brake for automobiles and it is especially adapted for use upon Ford type of automobiles and has for its principal object to provide an auxiliary brake of the contracting type adapted to be applied on the brake drums without the necessity of having to remove any parts therefrom and without interfering with the operation of the usual internal brakes.

Another important object of the invention is to provide an emergency brake of the above mentioned character, which will be positive in its action and which will further insure the proper actuation of the brakes when placed in use.

A still further object of the invention is to provide an emergency brake of the above mentioned character, which is simple in construction, inexpensive, strong and durable and very well adapted for the purposes for which it is designated.

Other objects and advantages of this invention will become apparent during the course of the following description.

In the accompanying drawings forming a part of this specification and in which like numerals designate like parts throughout the same, Figure 1 is a plan view of my invention showing the same applied in position, Figure 2 is a sectional view taken on line 2—2 of Fig. 1 with the brake mechanism for one wheel and its operating means shown in side elevation.

Figure 3 is a rear elevation of the brake shown in its applied position,

Figure 4 is a detail perspective view of the U-shaped member associated with my brake mechanism, and Figure 5 is a detail view of one of the reinforcing plates and the arm associated therewith showing the same in end elevation.

In the drawings wherein for the purpose of illustration is shown the preferred embodiment of my invention, the numeral 1 designates the rear axle housing of a motor vehicle, preferably of the Ford type and is of the usual construction. Each of the wheels 2 mounted at the respective ends of the axle housing 1 is provided with the brake drum 3, the latter being secured thereto in the usual manner. The brake drum 3 is adapted to house the usual internal brake shoes co-operating with the brake drum, and as this feature is no important part of the present invention, it is not thought necessary to show the same or further go into detail as to the construction thereof.

The brake drums 3 are furthermore braced by the radius rods 4 which are provided with the forked terminals 5 and for the purpose of securing the forked terminals 5 to the brake drums 3 the bolts 6 are provided. It being further understood that the forward ends of the radius rod 4 converge to the front end of the driving shaft of the motor vehicle in the well known manner. Adapted to extend around the brake drum 3 of the wheels 2 and to co-operate therewith, is the brake band 7. Each of the brake bands 7 comprises a split ring which is formed of suitable spring like material and has secured to its inner face the usual brake lining 8. Secured to the outer face of each split ring forming the brake band 7 are the reinforcing plates 9 and 10 respectively. These reinforcing plates which are secured to the outer faces of the split rings adjacent the free ends thereof are provided with upstanding lugs 11 and 12 respectively for the purpose hereinafter to be more fully described.

The reinforcing plate 9 which is formed and secured adjacent one end of the brake band 7 is provided with a downwardly extending arm 13 and this arm 13 extends from one side of the plate 9 and terminates at its free end at a point adjacent the diametrically opposite peripheral edge of the split ring as more clearly shown in Fig. 2 of the drawings. The downwardly extending arm 13 is furthermore provided with apertures therein for the purposes of securing the same to the inner side faces of each brake drum housing thereby the apertures in the arm 13 register with the apertures provided in the forked terminals of the radius rods 4 for the purposes of receiving the radius rod and the securing bolts 6 so as to hold the arm 13 in proper position upon the brake drum housing whereby circumferential movement of the brake band 7 on the brake drum 3 is prevented.

By having the plate 9 provided with the depending arm 13 it will be seen that the brake band 7 will be supported in position so as to extend circumferentially around the brake drum 3 carried by the wheel 2 in the manner which will enable the brake band to be readily operated as will be hereinafter more fully described. However, the brake band 7 will be permitted to move radially with respect to the drum so as to adjust itself into the proper frictional engagement with the brake drum when the brake bands are applied to use.

The upstanding lugs 11 and 12 respectively of the reinforcing plates 9 and 10 are provided with registering apertures and it is to be understood that the apertures provided in the upstanding lugs 11 of the reinforcing plate 9 is larger than the aperture provided in the upstanding lug 12 carried by the reinforcing plate 10. Secured to the upstanding lug 12 is one end of the link 14. This link 14 is provided with a threaded head 15 which passes through the aperture provided in the upstanding lug 12 and receives thereon the locking nut 16 for the purpose of holding the threaded end 15 of the link 14 in proper engagement with the lug 12. The link 14 is adapted to extend through the enlarged aperture provided in the upstanding lug 11 and terminates into a threaded end 17. To the threaded end 17 of the link 14 is connected the U-shaped member 18.

This U-shaped member 18 has one of its arms 21 provided with an opening 19 adjacent its free end for the purpose of permitting the same to be carried upon the threaded end 17 of the link 14 and a suitable locking nut 20 is associated with the threaded end 17 for the purpose of holding the U-shaped member 18 in position thereon. It is to be further understood that the arm 21 of the U-shaped member 18 is so associated with the link 17 for the purpose of contracting the band 7 around the brake drum 3 in the manner as will be hereinafter more fully described. The other arm 22 of the U-shaped member 18 is adapted to be connected to the usual brake cam for actuating the internal brake shoes in the brake drum housing in the usual manner.

The arm 21 of each of the U-shaped members 18 is provided with a threaded projection 23 and the purpose of this projection is to provide a means for connecting one end of the actuating rod 24 thereto. A suitable nut being threaded on the threaded projection 23 to hold the end of the actuating rod in position thereon. These rods 24 converge at their forward ends and are connected to the crank portion 25 of the transversely extending shaft 26. The latter being provided with an operating lever 27 as clearly shown in Fig. 2 of the drawings.

The links 14 in each of the brake bands 7 is adapted to support thereon a suitable coil spring 28 and this coil spring 28 is disposed beneath the upstanding lugs 11 and 12 formed on the reinforcing plates 9 and 10 respectively. The purpose of this coil spring 28 is to normally cause the free end of the split rings in the brake band to be kept in an inoperative position, thereby preventing the actuation of the brake band on the drum 3, and also for maintaining the U-shaped member 18 in such a position as to normally hold the internal brake shoe out of engagement with the brake band.

A suitable bracket 29 is supported by the bolt 30 on the lower portion of each brake drum housing and is adapted to extend transversely across the brake band 7 forming a guide thereof, and this bracket will normally retain the brake band 7 in position on the brake drum 3 at all times.

In operation, the lever 27 is actuated whereby the shaft 26 is operated and which results in the forward movement of the U-shaped member 18 whereby the links 14 are drawn forwardly through the lug 11 and thus causing the split rings to be contracted against the tension of the coil springs 28 and bind around the brake drums 3 whereby the proper gripping action on the outer faces of the brake drums is obtained. Simultaneously the brake cam lever arm 22 is actuated to operate the internal brake shoes in the usual manner, thereby causing both an internal and external gripping action on the brake drum to produce the necessary and quick stopping which the vehicle requires.

It will thus be seen from the foregoing description, that an emergency brake has been provided in addition to the usual internal braking mechanism, whereby the wheels of a motor vehicle may be easily and quickly brought to an inoperative position through the medium of the actuation of a simplified form of brake. Furthermore the simplicity of my invention renders the same very efficient and easy to install upon motor vehicles especially the Ford type, and does not interfere with the operation of the other parts of the motor vehicle or the braking mechanism usually found thereon.

By furthermore providing a U-shaped member in connection with the brake mechanism above described, the simultaneous operation of the U-shaped member to cause the actuation of both the external and internal brakes will insure the proper immediate actuation of the brakes which will also be positive in its action.

From the foregoing description of the construction of my improved apparatus, it will be seen that I have provided a simple, inexpensive and efficient means for carrying out the objects of the invention, and while I have particularly described the elements best adapted to perform the functions set forth,

I claim:

1. The combination with a pair of drums, of a rear axle housing interposed therebetween, split brake bands adapted to engage said drums, an arm depending from one end of each of said split brake bands for supporting the latter in position, and adapted to prevent circumferential movement of the brake bands on said drums, upstanding lugs carried by the other ends of said brake bands, links secured to one of said lugs and adapted to extend through an aperture provided in the other lug, U-shaped members having one of the arms thereof connected to said links, said U-shaped members having their other arms connected with internal portions of said drum, actuating rods extending from said U-shaped members, to a transverse shaft and connected thereto, and a lever associated with said transverse shaft for operating said rods.

2. A brake mechanism having in combination, a brake drum, a brake band associated with and adapted to engage said drum, means for preventing the circumferential movement of said brake band on said drum, a U-shaped member having one arm thereof adapted to contract said brake band on said drum, the other arm adapted to cooperate with internal brake means within said drum to expand the said internal brake means into engagement with the inner face of said brake drum, means for actuating said U-shaped member, and means for turning said U-shaped member to its normal inoperative position.

In testimony whereof I affix my signature.

HARRY MUSICK.